United States Patent
Shiiyama

(10) Patent No.: US 7,953,299 B2
(45) Date of Patent: May 31, 2011

(54) IMAGE SEARCHING APPARATUS, CONTROL METHOD THEREOF, PROGRAM, AND STORAGE MEDIUM

(75) Inventor: Hirotaka Shiiyama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 917 days.

(21) Appl. No.: 11/861,205

(22) Filed: Sep. 25, 2007

(65) Prior Publication Data

US 2008/0089615 A1   Apr. 17, 2008

(30) Foreign Application Priority Data

Oct. 13, 2006   (JP) ................. 2006-280596

(51) Int. Cl.
G06K 9/00 (2006.01)
G06K 9/54 (2006.01)
G06K 9/60 (2006.01)

(52) U.S. Cl. ........ 382/305; 382/159; 382/160; 382/195; 382/274; 382/162

(58) Field of Classification Search .......... 382/159–160, 382/162, 195, 274, 305–307
See application file for complete search history.

(56) References Cited

U.S. PATENT DOCUMENTS

| | | | |
|---|---|---|---|
| 6,243,713 B1 * | 6/2001 | Nelson et al. ........................ 1/1 |
| 6,728,406 B1 * | 4/2004 | Murao ........................... 382/191 |
| 7,075,683 B1 | 7/2006 | Shiiyama |
| 7,233,945 B2 | 6/2007 | Shiiyama |
| 7,236,652 B2 * | 6/2007 | Kasutani ....................... 382/305 |
| 7,734,107 B2 * | 6/2010 | Li .................................. 382/240 |
| 2006/0110073 A1 | 5/2006 | Matsushita et al. |
| 2006/0120627 A1 | 6/2006 | Shiiyama |
| 2006/0164702 A1 | 7/2006 | Shiiyama |
| 2007/0122037 A1 | 5/2007 | Shiiyama |

FOREIGN PATENT DOCUMENTS

JP   2004334335   11/2004

* cited by examiner

*Primary Examiner* — Wesley Tucker

(74) *Attorney, Agent, or Firm* — Fitzpatrick, Cella, Harper & Scinto

(57) ABSTRACT

An image searching apparatus which searches for an image that is similar to a query image from among a plurality of images is provided. The apparatus derives a color similarity that denotes a degree of similarity and a luminance similarity that denotes a degree of similarity between the query image and each of the images to be compared with. Then, the apparatus transforms the luminance similarity of each of the grayscale images to be compared with and the query image into an integrated similarity that is integrated in accordance with a correspondence between the color similarity and the luminance similarity of each of the color images to be compared with, and outputs the images to be compared in order by similarity, using the color similarity of the color images to be compared and the integrated similarity of the grayscale images to be compared.

10 Claims, 18 Drawing Sheets

FIG. 2

| IMAGE ID | FILE NAME WITH FULL PATH | DATE | COLOR IMAGE FLAG |
|---|---|---|---|
| 0000001 | C:¥img¥ship.bmp | 2002/12/19 | 1 |
| 0000002 | C:¥img¥car.bmp | 2002/12/20 | 0 |
| 0000003 | C:¥img¥watch.bmp | 2002/12/21 | 1 |

FIG. 3

| IMAGE ID | LUMINANCE FEATURE INFORMATION |
|---|---|
| 0000001 | ・・・・・・ |
| 0000002 | ・・・・・・ |
| 0000003 | ・・・・・・ |

FIG. 4

| IMAGE ID | COLOR FEATURE INFORMATION |
|---|---|
| 0000001 | ・・・・・・ |
| 0000002 | ・・・・・・ |
| 0000003 | ・・・・・・ |

| | | | | | | | |
|---|---|---|---|---|---|---|---|
| SCALE ID | 0 | 1 | 2 | 3 | 4 | 14 | 15 |
| SCOPE | 0~15 | 16~31 | 32~47 | 48~63 | 64~79 | 222~238 | 239~255 |
| FREQUENCY | | | | | | | |

701  
702  
703

~

| 1 | 2 | 4 |
|---|---|---|
| 3 | 5 | 7 |
| 6 | 8 | 9 |

FIG. 12

|   | 1 | 2 | 3 | 4 | 5 | 6 | 7 | 8 | · · · · · |
|---|---|---|---|---|---|---|---|---|---|
| 1 | 0 | 1 | 1 | 5 | 1 | 5 | 7 | 7 | · · · · · |
| 2 |   | 0 | 2 | 1 | 1 | 7 | 2 | 5 | · · · · · |
| 3 |   |   | 0 | 7 | 1 | 1 | 5 | 2 | · · · · · |
| 4 |   |   |   | 0 | 1 | 9 | 1 | 7 | · · · · · |
| ⋮ |   |   |   |   |   |   |   |   |   |

1201 (rows), 1202 (columns), 1203

F I G. 14

|   | 1 | 2 | 3 | 4 | 5 | 6 | 7 | 8 | · · · · · |
|---|---|---|---|---|---|---|---|---|---|
| 1 | 0 | 8 | 16 | 24 | 32 | 40 | 48 | 56 | · · · · · |
| 2 |   | 0 | 8 | 16 | 24 | 32 | 40 | 48 | · · · · · |
| 3 |   |   | 0 | 8 | 16 | 24 | 32 | 40 | · · · · · |
| 4 |   |   |   | 0 | 8 | 16 | 24 | 32 | · · · · · |
| ⋮ |   |   |   |   |   |   |   |   |   |

1402 (columns), 1401 (rows), 1403

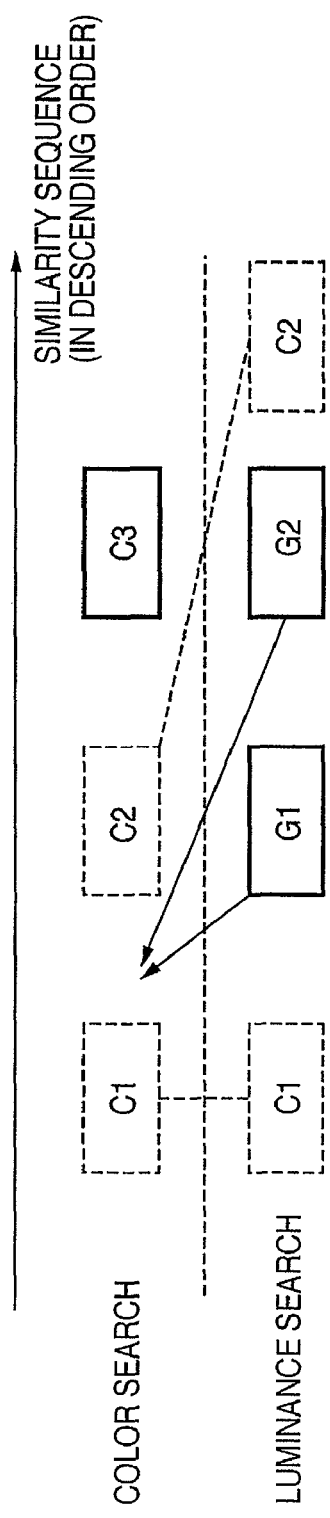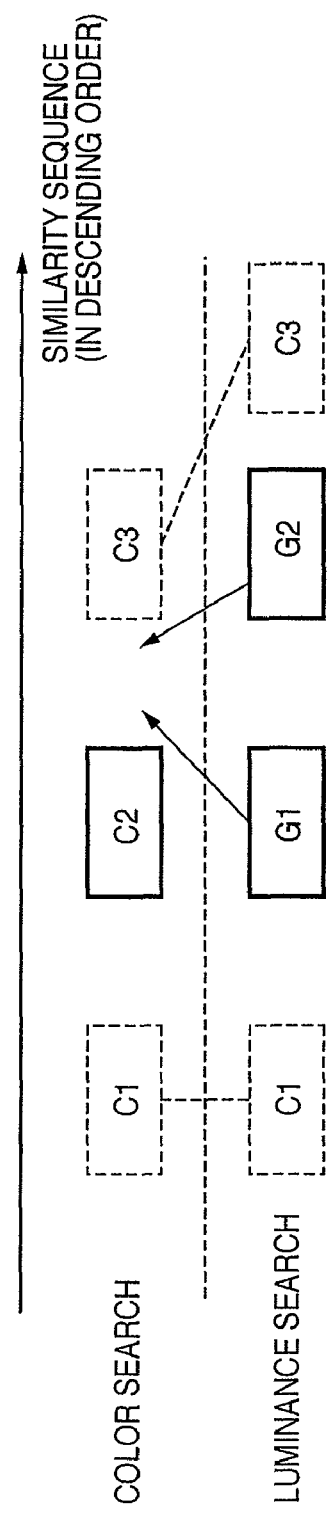

IMAGE SEARCHING APPARATUS, CONTROL METHOD THEREOF, PROGRAM, AND STORAGE MEDIUM

BACKGROUND OF THE INVENTION

1. Field of the Invention

The present invention relates to an image searching apparatus, a control method thereof, a program, and a storage medium, in particular to a technology that searches for an image that is similar to a queried image from among a plurality of comparative target images that include color images and grayscale images.

2. Description of the Related Art

A variety of image searching apparatuses have been put forth over time that employ color information or luminance information as an image feature parameter. A search for a similar image using color information, i.e., a color information search, however, merely performs a registration process using extracted color characteristics, and performs a search according to a comparison that takes color into consideration. A search for a similar image using luminance information, i.e., a luminance information search, on the other hand, merely performs a registration process using extracted luminance characteristics, and performs a search according to a comparison that takes luminance into consideration. The color information search and the luminance information search are thus treated as distinct processes, and the search results are accordingly outputted distinctly from one another. Consequently, it has heretofore not been possible to perform a unified search that leverages the strengths of the respective search technologies.

A configuration does exist, however, that resolves such a lack of utility by facilitating a search when comparative target images are color or grayscale images alike, by extracting the luminance information when the search source image is a grayscale image, even if the comparative target images are color images, per Japanese Patent laid-open No. 2004-334335.

The pre-existing configuration, however, did not perform a comparison of grayscale images when the search source image is a color image, even if grayscale images were present, instead treating only the color images as the comparative target images. Consequently, it has heretofore not been possible to perform a unified search using a single search technology.

When the comparative target images are grayscale images, the configuration that Japanese Patent laid-open No. 2004-334335 discloses treats the grayscale images as color images, and extracts and stores the color features, which are actually the grayscale features. Treating the grayscale images as color images involves assigning the same value to each of the RGB color channels, thus precluding obtaining features relating to color qualities, thereby dramatically lowering the degree of similarity between the grayscale images and the color images. Consequently, it is not possible to accurately perform a search for similar images using the configuration that Japanese Patent laid-open No. 2004-334335 discloses.

SUMMARY OF THE INVENTION

The present invention was devised with the preceding problems in mind, and has as an objective to offer a technology that facilitates searching for similar images with a high degree of precision, even when the comparative target images comprise a mixture of color images and grayscale images alike.

According to one aspect of the present invention, an image searching apparatus which searches for an image that is similar to a query image from among a plurality of images to be compared with, comprises:

an extraction unit adapted to extract a color feature parameter and a luminance feature parameter of the query image;

a first derivation unit adapted to compare the color feature parameter of the query image with the color feature parameter of each of color images to be compared with, and to derive a color similarity that denotes a degree of similarity therebetween;

a second derivation unit adapted to compare the luminance feature parameter of the query image with the luminance feature parameter of each of color images and grayscale images to be compared with, and to derive a luminance similarity that denotes a degree of similarity therebetween;

a transform unit adapted to transform the luminance similarity of each of the grayscale images to be compared with and the query image into an integrated similarity that is integrated in accordance with a correspondence between the color similarity and the luminance similarity of each of the color images to be compared with; and an output unit adapted to output the images to be compared in order by similarity, using the color similarity of the color images to be compared that is derived by the first derivation unit, and the integrated similarity of the grayscale images to be compared that is transformed via the transform unit.

According to another aspect of the present invention, a control method of an image searching apparatus which searches for an image that is similar to a query image from among a plurality of images to be compared with, comprises the steps of:

extracting a color feature parameter and a luminance feature parameter of the query image;

comparing the color feature parameter of the query image with the color feature parameter of each of color images to be compared with, and deriving a color similarity that denotes a degree of similarity therebetween;

comparing the luminance feature parameter of the query image with the luminance feature parameter of each of color images and grayscale images to be compared with, and deriving a luminance similarity that denotes a degree of similarity therebetween;

transforming the luminance similarity of the grayscale images to be compared with and the query image into an integrated similarity that is integrated in accordance with a correspondence between the color similarity and the luminance similarity of the color images to be compared with; and outputting the images to be compared in order by similarity, using the color similarity of each of the color images to be compared that is derived by the first derivation step, and the integrated similarity of each of the grayscale images to be compared that is transformed via the transform step.

Further features of the present invention will become apparent from the following description of exemplary embodiments (with reference to the attached drawings).

BRIEF DESCRIPTION OF THE DRAWINGS

FIG. 2 depicts an example of content stored in an image management database.

FIG. 3 depicts a typical example of a luminance information index.

FIG. 4 depicts a typical example of a color information index.

FIG. 12 is a schematic depiction of an exemplary penalty matrix between color bin IDs.

FIG. 14 is a schematic depiction of an exemplary penalty matrix between luminance scale IDs.

FIG. 20 is a schematic depiction wherein the color similarity comparison search results are denoted in the upper tier, and the luminance similarity comparison search results are denoted in the lower tier.

FIG. 21 is a schematic depiction wherein the color similarity comparison search results are denoted in the upper tier, and the luminance similarity comparison search results are denoted in the lower tier.

DESCRIPTION OF THE EMBODIMENTS

Following is a detailed description of exemplary embodiments of the present invention, with reference to the attached drawings. It is to be understood, however, that the configuration elements disclosed according to the embodiments are exemplary, and the scope of the present invention is not restricted thereto in any way.

First Embodiment

Hardware Configuration of Image Searching Apparatus

Figure 23:
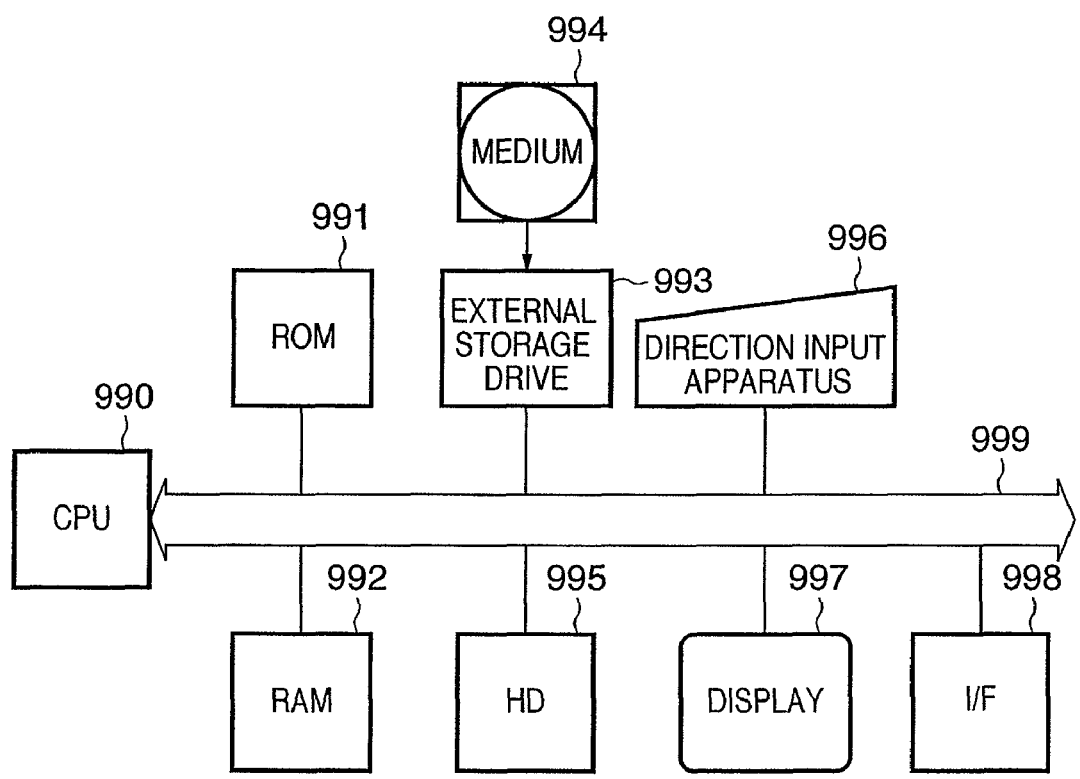
FIG. 23 is a block diagram of a schematic depiction of a hardware configuration of the image searching apparatus.

The present section will commence with a description of a hardware configuration of an image searching apparatus according to a first embodiment, with reference to FIG. 23.

FIG. 23 is a block diagram of a schematic depiction of the hardware configuration of the image searching apparatus. The image searching apparatus according to the embodiment is implemented by such devices as a personal computer (PC), a workstation, or a personal data assistant (PDA), for example.

Reference numeral 990 in FIG. 23 is a CPU. The CPU 990 executes such code as may be stored on a hard drive 995 (to be described hereinafter) as an application program, an operating system (OS), or a control program, as well as controlling a temporary storage in a RAM 992 of such things as data or files that are required for the execution of the program.

Reference numeral 991 is a ROM, wherein is stored such programs as a base I/O program, as well as a variety of types of data that are used in basic processing, such as font data and template data. Reference numeral 992 is a RAM for temporarily storing the variety of types of data, which serves such functions as a main memory and a workspace for the CPU 990.

Reference numeral 993 is an external storage drive for implementing access to a recording medium. It is capable of loading a program or other information that is stored on a recording medium 994 onto the computer system. The recording medium 994 may be any of a floppy disk, a CD-ROM, a CD-R, a CD-RW, a PC card, a DVD, an IC memory card, an M/O disk, or a memory stick, for example.

Reference numeral 995 is an external storage device. A hard drive is used according to the embodiment that functions as a large capacity storage device. The hard drive 995 stores such information as an application program, an operating system, and other associated programs.

Reference numeral 996 is a direction input apparatus, corresponding to such devices as a keyboard, a pointing device, such as a mouse, or a touch panel interface. A user employs the direction input apparatus 996 to input directions, such as a command that controls the image searching apparatus according to the embodiment.

Reference numeral 997 is a display, which displays such information as the command that is inputted via the direction input apparatus 996 or a response thereto that is outputted by the image searching apparatus.

Reference numeral 999 is a system bus, which controls a flow of data within the image searching apparatus. Reference numeral 998 is an interface, which performs an interchange of data between the image searching apparatus and an apparatus that is external thereto.

It is possible to configure the respective foregoing apparatuses in software that implements equivalent functions, in place of a hardware apparatus.

While the example that is depicted according to the embodiment involves loading the program and the related data according to the embodiment directly from the storage medium 994 into the RAM 992 and executing the program thereby, the embodiment is not restricted thereto. It would be permissible, for example, for the program according to the embodiment to be pre-installed in the hard drive 995, and to be loaded therefrom into the RAM 992 as and when the program is run. It would also be possible for the program according to the embodiment to be stored in the ROM 991, configured so as to constitute a portion of a memory map, and directly executed by the CPU 990.

While the image searching apparatus according to the embodiment is described in a configuration that is implemented by a single image searching apparatus for ease of description according to the embodiment, it would be permissible for the present invention according to the embodiment to be implemented by a configuration wherein resources are distributed to a plurality of apparatuses. For example, a configuration that distributes the storage and computation resources to a plurality of apparatuses would be permissible. Alternatively, it would be permissible to distribute the resources on the image searching apparatus for each configuration element that is virtually implemented thereupon, and have parallel processing performed thereby.

Configuration of Functions of Image Searching Apparatus

Figure 1:
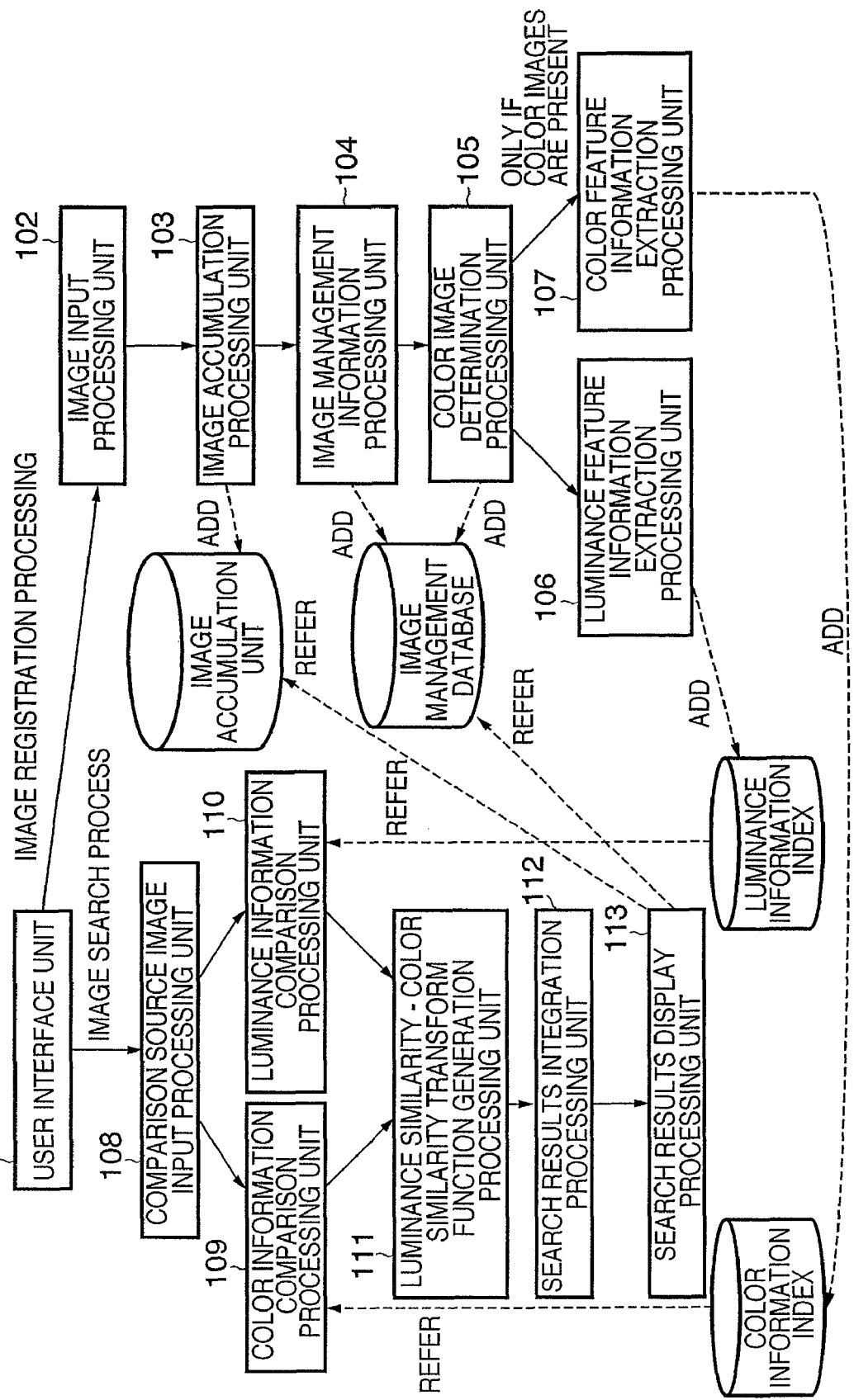
FIG. 1 is a block diagram depicting a typical configuration of functions of a process system for an image searching apparatus.

Following is a description of a configuration of functions for searching for similar images by way of the image searching apparatus, with reference to FIG. 1. FIG. 1 is a block diagram depicting a typical configuration of functions of a process system for the image searching apparatus according to the embodiment. Following is a description according to the embodiment, starting with image recording processing, followed by image searching processing, and displaying search results processing.

Each function block depicted in FIG. 1 is implemented when the CPU 990 in the image searching apparatus described in FIG. 23 executes a program that is loaded into the RAM 992 therein, in collaboration with each hardware device depicted in FIG. 23. It is to be understood that it would be permissible to have some or all of the function blocks implemented in dedicated hardware as well.

The similar image search includes a recording process that extracts and stores the features, as well as a search process that either extracts a baseline image to be used for comparison of similarity or loads a recorded feature parameter, and performs a comparison therewith. Thereafter, a process of displaying an image that is found by the search is executed. While an image is partitioned into a plurality of regions with regard to extracting the features thereof according to the embodiment, the following description is an exemplary description, wherein it is presumed that the number of blocks in the vertical direction thereof is the same as the number of blocks in the horizontal direction thereof, regardless of aspect ratio or size, and that the features of the baseline image when searching are also extracted in the same number of blocks horizontally as well as vertically.

A user interface (UI) 101 in FIG. 1 offers an interface that the user can operate, and is a function element that performs such operations as requesting a direction from the user, as well as displaying the result thereof. The user interface 101 may be implemented by such devices as the direction input apparatus 996 and the display 997, for example. When the user interface 101 receives a direction that is inputted by the user, the image searching apparatus according to the embodiment branches into the image recording process and the image search process and executes the prescribed process, in response to the description of the direction thus inputted. Following is a description of the task and function of each function element in FIG. 1 other than the user interface 101, as pertains to the description of each respective process.

Image Recording Process

The image recording process commences with an image input processing unit 102 performing an image input process, thereby loading an image into the memory. An image accumulation processing unit 103 records and stores the image that is in the memory in an image accumulation unit, and stores a file name thereof. An image management information processing unit 104 assigns a unique ID to the image, and stores the image ID, the file name, and the date, as depicted in FIG. 2. It is to be understood that FIG. 2 depicts an example of content that is stored in an image management database.

A determination that a color image determination processing unit 105 executes as to whether the registered image is a color image or a grayscale image may be executed by analyzing a data format, for example. It is possible to comprehend, from the standpoint of the data format, whether the image is a color image, a black-and-white image, or a grayscale image. For example, the DIB graphical data format that is commonly used in Windows® denotes a number of bits needed to represent one pixel in a biBitCount, a constituent of a BITMAPINFOHEADER record structure that is within a data header of the file format. Querying the biBitCount thus allows comprehension of whether the image is color, black-and-white, or grayscale image. For example, the image is a full color image if the biBitCount is 24, a binary black-and-white image if the biBitCount is 1, and a biBitCount of 8 signifies that the image is either a 256-color image or a grayscale image. If the biBitCount is 8, it is possible to determine whether the color palette depicts grayscale or is reduced to 256 colors by querying the content of bmicolors, a constituent of a BITMAPINFO record structure that is within the data header. It is thus possible to decide whether the image is a 256-color image or a grayscale image in accordance with the description of the color palette. Grayscale images include black-and-white images, i.e., binary images, according to the embodiment. In particular, a binary image, the density whereof is saved, may be made nearly equivalent to a grayscale image by image processing, i.e., scaling down.

The color image determination processing unit 105 controls a storage of the color/grayscale determination result to a color image flag field as pertains to a document management database schema as depicted in FIG. 2. It is presumed according to the embodiment that the image is a color image if the value of the flag is 1, and a grayscale image if the value of the flag is 0.

If the image is a grayscale image, a control is performed such that only a luminance-feature extraction process is performed, via a luminance feature extraction processing unit 106. If the image is a color image, the control is instead performed such that both the luminance feature extraction process is performed via the luminance feature extraction processing unit 106, and that a color feature information extraction process is performed via a color feature information extraction processing unit 107. The findings are linked to the image ID and added to a luminance information index and a color information index, respectively, via a schema such as the schema depicted in FIG. 3 and FIG. 4. FIG. 3 depicts a typical example of the luminance information index. FIG. 4 depicts a typical example of the color information index. The image ID is used only once, allowing the image management database record to be handled via the image ID.

Luminance Feature Extraction Process

Figure 5:
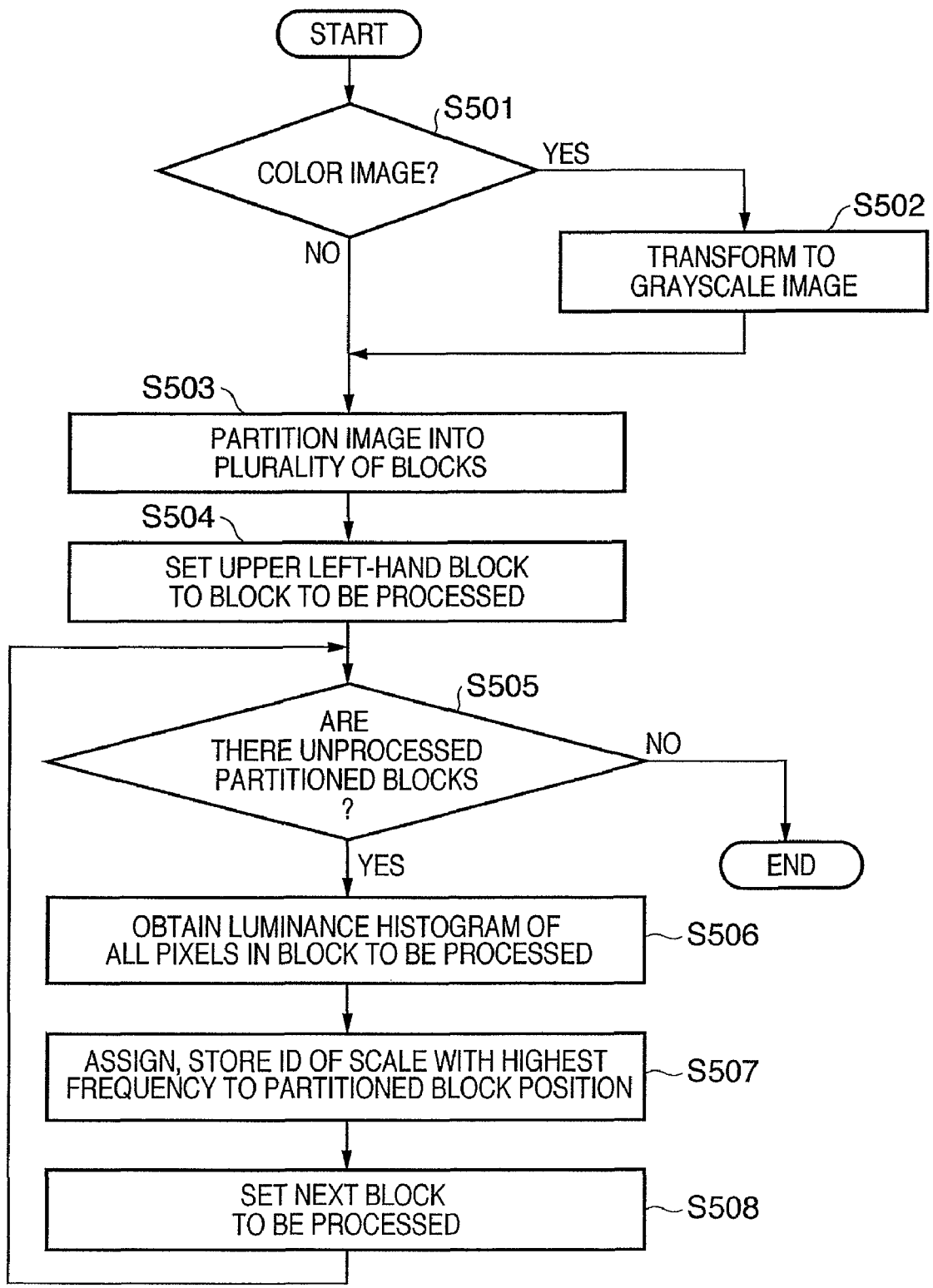
FIG. 5 is a flowchart depicting a flow of a luminance feature extraction process.
Figures 6, 7:
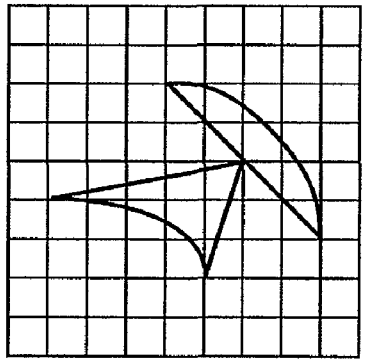
FIG. 6 is a schematic depiction of an example of an image that is partitioned into a plurality of blocks.
FIG. 7 depicts an example of a table that equalizes an eight-bit luminance signal.

Following is a detailed description of the luminance feature extraction process that the luminance feature extraction processing unit 106 executes. The process of extracting a feature that relates a scale of each respective region of the plurality of regions into which the image is partitioned that possesses a maximal luminance via a luminance histogram pertaining to a position of each respective region thereof as a representative luminance is described with reference to FIGS. 5 through 7. FIG. 5 is a flowchart depicting a flow of the luminance feature extraction process. FIG. 6 is a schematic depiction of an example of an image that is partitioned into a plurality of blocks. FIG. 7 depicts an example of a table that equalizes a scale of an eight-bit luminance signal.

A query is performed in step S501 of the result of the determination that is performed at the beginning of the recording process as to whether or not the image is a color image. It is possible to perform the determination in accordance with the image data format, as per the foregoing, for example.

If the image is a color image, i.e., step S501 is "YES", the color image is transformed into a grayscale image in step S502. The transform computation may be performed using a well-known RGB color matrix. Employing a YCbCr color space, for example, relates a luminance Y and a 24-bit RGB as per Formula 1:

$$Y=0.29900*R+0.58700*G+0.11400*B \quad (1)$$

It is thus permissible to derive Y as the luminance according to the Formula 1.

When the process in step S502 is completed, the sequence proceeds to step S503. The flow also proceeds to step S503 if the image is not a color image in step S501.

In step S503, the image is partitioned into a grid of a plurality of horizontal and vertical lines, such as per FIG. 6. While the present example partitions the image into nine blocks by nine blocks for convenience in imaging, a range from eight blocks by eight blocks to 15 blocks by 15 blocks, or thereabouts, would be desirable in actual use.

The process in steps S506 through S508 is executed for each respective block thus partitioned. Therefore, a block with which to commence the process is set in step S504.

Figures 8, 9:
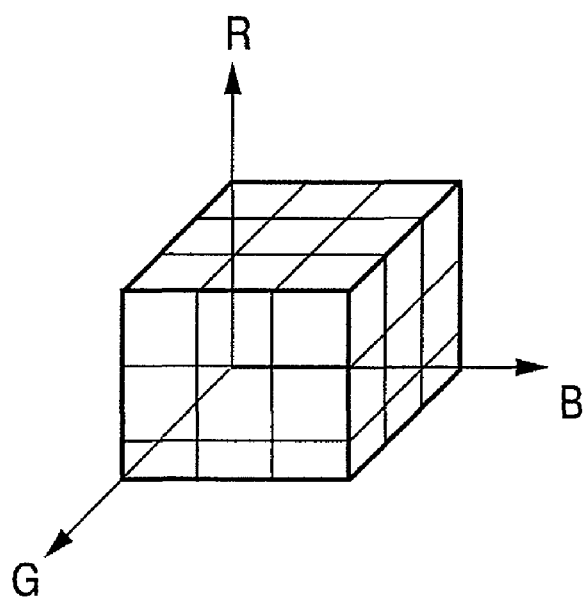
FIG. 8 depicts an example of a block scanning sequence.
FIG. 9 is a schematic depiction of a color bin in a color feature parameter space.

The image partition block that is identified as the block to be processed is set in step S504 as the upper left hand block, for example. It would be desirable, however, to set a sequence of the partitioned blocks such as the sequence that is depicted in FIG. 8. FIG. 8 depicts an example of a block scanning sequence. The example depicted in FIG. 8 is a circumstance of operating in a sequence of parallel diagonal lines of the image. The sequence of the blocks to be processed is not restricted thereto, however. It would be permissible, for example, to set the scanning sequence to scan to the right from the upper left-hand corner, and to scan the next row also from left to right when the scan of the preceding row is finished.

A determination is made in step S505 as to whether or not a block is present that has yet to be processed. If no unprocessed blocks are present, i.e., step S505 is "NO", the process terminates. If there are unprocessed blocks present, i.e., step S505 is "YES", the sequence proceeds to step S506.

A comparison is performed in step S506 of all pixel values in the block to be processed with the table in FIG. 7, and a histogram is taken for the scales in the table in FIG. 7. Reference numeral 701 in FIG. 7 is a scale ID that denotes a luminance scale. Reference numeral 702 denotes a scope of luminance of each scale. A pixel with a luminance of 40 would correspond to a luminance scale of 2, for example. In step S506, the luminance scale is thus derived for all pixels contained in the block to be processed, and a number of pixels, i.e., a degree, is derived that corresponds to each respective scale ID.

A determination is made in step S507 that the scale ID that corresponds to the scale with the highest frequency, i.e., degree, is the representative luminance of the image partitioned block thereof. It is not necessary for the scale ID that is determined to be the representative luminance to be the maximum degree, provided that the trend of the luminance of the block to be processed is signified. It would be permissible, for example, for a scale that corresponds to an average luminance of each respective pixel that is contained in the block to be processed to be treated as the representative luminance. It is necessary, however, to be consistent in selecting either the frequency or the average to be the representative luminance.

In step S508, the next block in the sequence depicted in FIG. 8 is taken as the block to be processed. The process in step S505 is thus repeated until no unprocessed blocks remain.

It is possible to obtain the luminance feature information for a given image by way of such a process as the preceding. The luminance feature information thus obtained is stored in the luminance information index in the schema depicted in FIG. 3 in a form that relates the image ID to the luminance feature information, in the example.

The preceding luminance feature information is exemplary. It would be possible to use any value as the luminance feature information, provided that the feature of the image in accordance with the luminance thereof were depicted.

Color Feature Information Extraction Process

Following is a description of the color feature information extraction process that the color feature information extraction processing unit 107 executes. It is possible to intuit that the color feature information extraction process is an extension of the process of extracting the luminance feature information into three dimensions. For example, whereas the extraction of the luminance feature information employed the one-dimensional scale table depicted in FIG. 7, the color feature information extraction process employs a plurality of three-dimensional component spaces, i.e., color bins, which are component regions into which a color space such as is depicted in FIG. 9 is partitioned, to compute the histogram. FIG. 9 is a schematic depiction of a color bin in a color feature parameter space.

Figure 10:
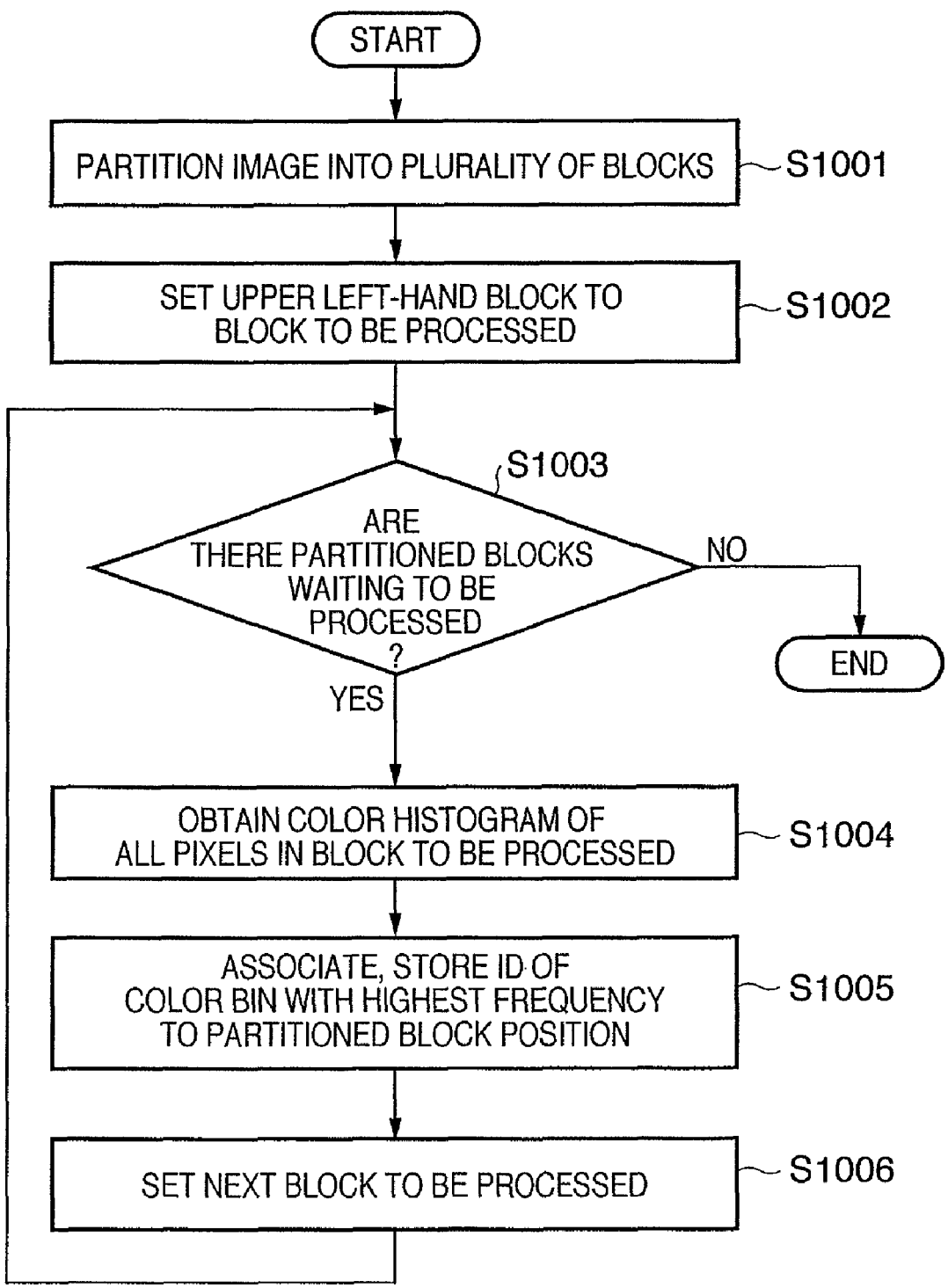
FIG. 10 is a flowchart depicting a flow of a color feature information extraction process.

The color feature information extraction process involves extracting a position and a feature of each respective region of the plurality of regions into which the image is partitioned, in the form of a representative color, by way of an ID of the color bin that possesses the most frequent color as determined by the color histogram. The process is described with reference to FIGS. 9 and 10. FIG. 10 is a flowchart depicting a flow of the color feature information extraction process. FIG. 6 depicts an example of the image partition block, and FIG. 9 depicts an example of a scale equalization of the RGB color space into 3*3*3=27 bins. While 6*6*6=216 color bins, or thereabouts, would be preferable in actual usage, the present form has been adopted for purposes of two-dimensional representation.

In FIG. 10, step S1001, the image is partitioned into a grid of a plurality of horizontal and vertical lines, such as per FIG. 6. While the present example partitions the image into 9*9=81 blocks, a partitioning into 15*15=225 blocks, or thereabouts, would be desirable in actual use.

The process in steps S1004 through S1006 is executed for each respective block thus partitioned. Therefore, a block with which to commence the process is set in step S1002.

The image partition block that is identified as the block to be processed is set in step S1002 as the upper left hand block, for example. It would be desirable, however, to set a sequence of the partitioned blocks such as the sequence that is depicted in FIG. 8. FIG. 8 depicts an example of a block scanning sequence. The example depicted in FIG. 8 is a circumstance of operating in a sequence of parallel diagonal lines of the image. The sequence of the blocks to be processed is not restricted thereto, however. It would be permissible, for example, to set the scanning sequence to scan to the right from the upper left-hand corner, and to scan the next row also from left to right when the scan of the preceding row is finished. A determination is made in step S1003 as to whether or not a block is present that has yet to be processed. If no unprocessed blocks are present, i.e., step S1003 is "NO", the process terminates. If there are unprocessed blocks present, i.e., step S1003 is "YES", the sequence proceeds to step S1004.

In step S1004 all pixel values in the block to be processed are projected to the color bins that are created by partitioning the color space in FIG. 9, and the histogram is taken for color bins. A determination is thus made as which color bins contain which of the pixels in the block to be processed, and the number of pixels, i.e., the degree, corresponding to each respective color bin derived.

A determination is made in step S1005 that the color ID that corresponds to the color bin with the highest frequency, i.e., degree, is the representative color of the image partitioned block thereof. It is not necessary for the scale ID that is determined to be the representative color to be the maximum degree, provided that the trend of the color of the block to be processed is signified. It would be permissible, for example, for a scale that corresponds to an average color of each respective pixel that is contained in the block to be processed to be treated as the representative color. It is necessary, however, to be consistent in selecting either the frequency or the average to be the representative color.

In step S1006, the next block in the sequence depicted in FIG. 8 is taken as the block to be processed. The process in step S1003 is thus repeated until no unprocessed blocks remain.

It is possible to obtain the color feature information for a given image by way of such a process as the preceding. The color feature information thus obtained is stored in the color information index in the schema depicted in FIG. 4, in a form that relates the image ID to the color feature information, in the example.

The preceding color feature information is exemplary. It would be possible to use any value as the color feature information, provided that the feature of the image in accordance with the color thereof were depicted.

Image Search Process

When performing the image search process, a comparison source image input processing unit 108 inputs a comparison source image, i.e., a query image, which the user specifies. The search process is described in an exemplary manner in a circumstance wherein the comparison source image is a color image according to the embodiment. The image search involves extracting the color feature information and the luminance feature information, as is done during the recording, and a similar image search performed that employs the respective features. A color information comparison processing unit 109 employs the feature information relating to the color to perform a similarity comparison between the comparison source image and an image with which the comparison source image is to be compared, and a luminance information comparison processing unit 110 employs the feature information relating to the luminance to perform an additional comparison thereof. Following is a description of the color information comparison processing unit 109 and the luminance information comparison processing unit 110.

Search Process Using Color Feature

Figure 11:
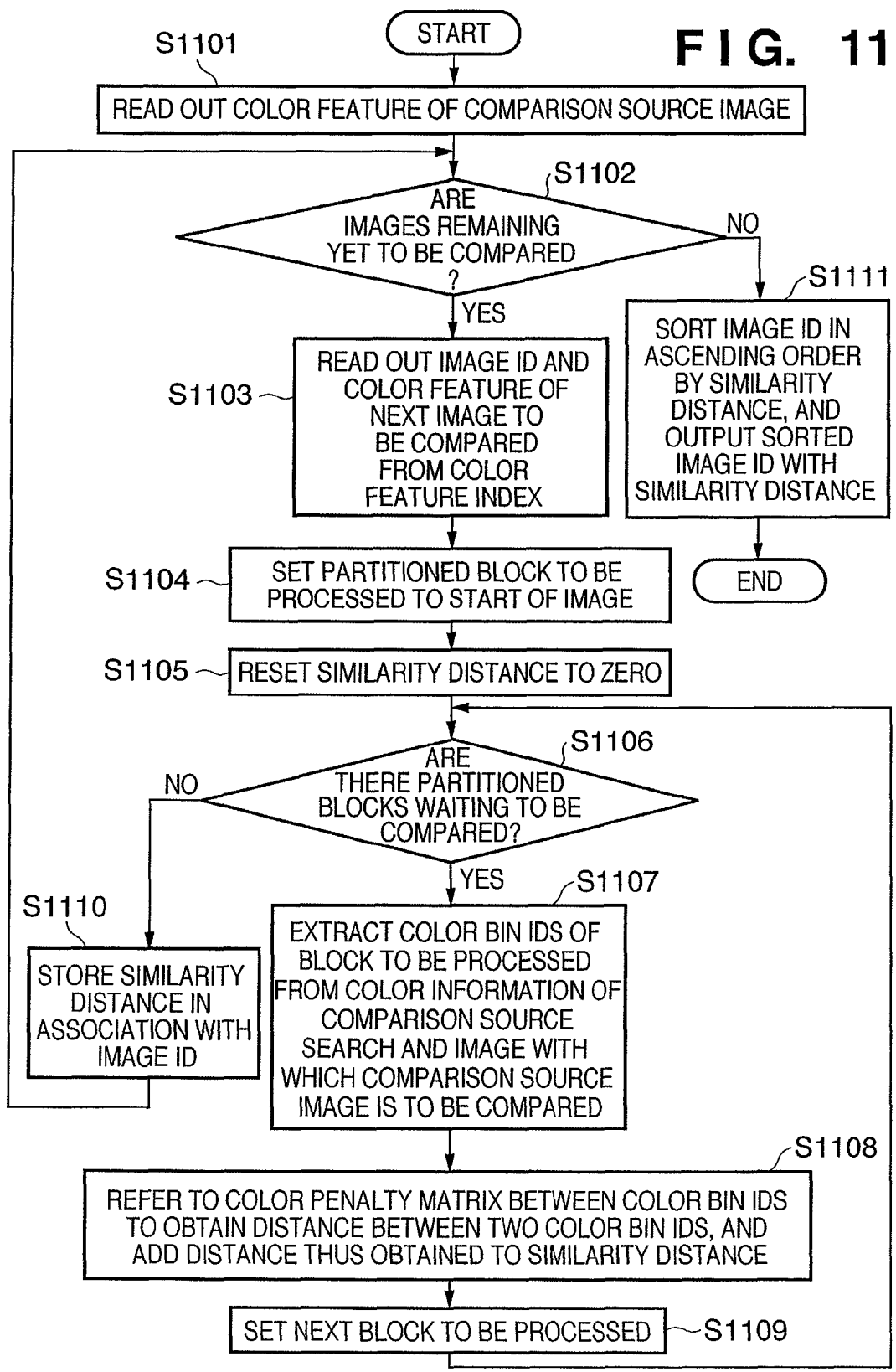
FIG. 11 is a flowchart depicting a flow of a search process using the color feature.

Following is a description of a process of matching the color feature information that the color information comparison processing unit 109 executes, with reference to FIG. 11. FIG. 11 is a flowchart depicting a flow of a search process using the color feature. The following processes are performed for the color and the grayscale comparison source images, respectively.

In step S1101, the color feature of the comparison source image is read out from the color feature index. A process of comparing the comparison source image with other images is performed, and a similarity distance derived, which denotes the similarity between the images, in steps S1102 through S1110.

A determination is made in step S1102 as to whether or not the recorded image to be compared is present. If the recorded image to be compared is not present, i.e., step S1102 is "NO", the image ID is sorted in step S1111, in ascending order by the prior derived similarity distance, and the sorted image ID and the similarity distance are outputted as the search results. If the recorded image to be compared is present, i.e., step S1102 is "YES", the sequence proceeds to step S1103.

In step S1103, the image ID and the color feature of the recorded images that have yet to be compared are read out from the color feature index. The partitioned block to be processed is set, for example, to the start of the image, in step S1104, and the similarity distance thereof is reset to zero in step S1105.

The derivation of the similarity distance of the image is performed by comparing the features of each respective partitioned block. Consequently, a process in steps S1107 through S1109 is executed for each respective partitioned block.

A determination is made in step S1106 as to whether or not an image partitioned block that is yet to be compared is present. If the image partitioned block that is yet to be compared is present, i.e., step S1106 is "YES", the sequence proceeds to step S1107, or to step S1110 if the image partitioned block that is yet to be compared is not present, i.e., step S1106 is "NO".

In step S1107, the color bin IDs of the block to be processed are extracted from the respective color information of the comparison source search and the image with which the comparison source image is to be compared.

In step S1108, the distance between the two color bin IDs that are extracted in step S1107 is derived and added to the similarity distance. The distance between the two color bin IDs may be obtained, for example, by querying the penalty matrix between the color bin IDs, which represents the degree of similarity of the colors of the respective color bins.

FIG. 12 is a schematic depiction of an exemplary penalty matrix between the color bin IDs. Reference numeral 1201 in FIG. 12 denotes one set of the respective color bin IDs to be compared, reference numeral 1202 in FIG. 12 denotes the other set of the respective color bin IDs to be compared, and a group of numbers 1203 that are written in the matrix denote the range between the two color bin IDs. As depicted in FIG. 12, the penalty matrix possesses range values that are zero for when the color bin IDs are the same, and that get bigger the greater the difference between the color bin IDs becomes. All of the diagonal values where the color bin IDs are the same are zero, possessing a reflexive property of the diagonal positions. It is thus possible to rapidly execute the process when querying the penalty matrix to derive the color bin ID range, because the similarity distance of the two color bin IDs is computed simply by a table query.

In step S1108, the penalty matrix between the color bin IDs is queried using the two color bin IDs that are extracted in step S1107, whereby a localized similarity distance is obtained and added to the similarity distance.

In step S1109, the block to be processed is shifted to the next block in the sequence.

If, on the other hand, the image partitioned block that is yet to be compared is not present in step S1106, i.e., step S1106 is "NO", the sequence proceeds to step S1110, wherein the similarity distance is stored in association with the image ID, followed by another check in step S1102 for the presence or absence of an image to be compared. If no image to be compared remains in step S1102, i.e., step S1102 is "NO", the sequence proceeds to step S1111, wherein the image ID is sorted in ascending order by the similarity distance, and the sorted image ID and the similarity distance are temporarily stored in the color information index as the color feature similarity comparison findings.

The search results by the color feature denote an example, and it would be permissible to employ any search process, provided that the image search is performed in accordance with the color feature information.

Search Process Using Luminance Feature

Figure 13:
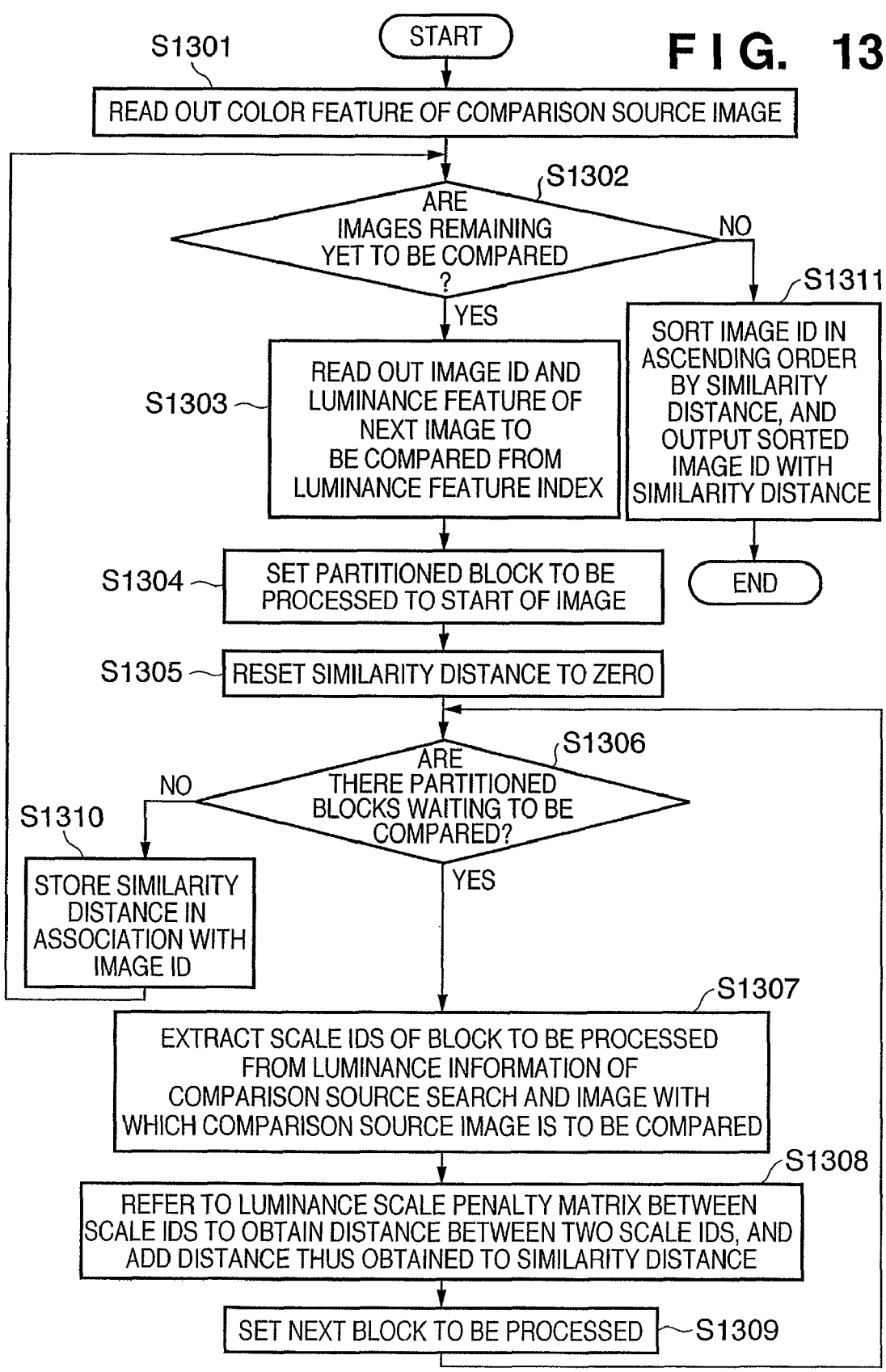
FIG. 13 is a flowchart depicting a flow of a luminance feature search process.

Following is a description of a process of matching the luminance feature information that the luminance information comparison processing unit 110 executes, with reference to FIG. 13. FIG. 13 is a flowchart depicting a flow of the luminance feature search process. The following processes are performed for the color and the grayscale comparison source images, respectively.

In step S1301, the luminance feature of the comparison source image is read out from the luminance information index. A process of comparing the comparison source image with other images is performed, and the similarity distance derived, which denotes the similarity between the images, in steps S1302 through S1310.

A determination is made in step S1302 as to whether or not the recorded image to be compared is present. If the recorded image to be compared is not present, i.e., step S1302 is "NO", the image ID is sorted in step S1311, in ascending order by the prior derived similarity distance, and the sorted image ID and the similarity distance are outputted as the search results. If the recorded image to be compared is present, i.e., step S1302 is "YES", the sequence proceeds to step S1303.

In step S1303, the image ID and the luminance feature of the recorded images that have yet to be compared are read out from the luminance information index. The partitioned block to be processed is set, for example, to the start of the image, in step S1304, and the similarity distance thereof is reset to zero in step S1305.

The derivation of the similarity distance of the image is performed by comparing the features of each respective partitioned block. Consequently, a process in steps S1307 through S1309 is executed for each respective partitioned block.

A determination is made in step S1306 as to whether or not an image partitioned block that is yet to be compared is present. If the image partitioned block that is yet to be compared is present, i.e., step S1306 is "YES", the sequence proceeds to step S1307, or to step S1310 if the image partitioned block that is yet to be compared is not present, i.e., step S1106 is "NOT".

In step S1307, a luminance scale ID of the block to be processed is extracted from the respective color information of the comparison source search and the image with which the comparison source image is to be compared.

In step S1308, the distance between the two luminance scale IDs that are extracted in step S1307 is derived and added to the similarity distance. The distance between the two luminance scale IDs may be obtained, for example, by querying the penalty matrix between the color bin luminance scale IDs, which represents the degree of similarity of the luminance of the respective luminance scales.

FIG. 14 is a schematic depiction of an exemplary penalty matrix between luminance scale IDs, which is created based on the quantization table depicted in FIG. 7. Reference numeral 1401 in FIG. 14 denotes one set of the respective luminance scale IDs to be compared, reference numeral 1402 in FIG. 14 denotes the other set of the respective luminance scale IDs to be compared, and a group of numbers 1403 that are written in the matrix denote the range between the two luminance scale IDs. As depicted in FIG. 14, the penalty matrix possesses range values that are zero for when the luminance scale IDs are the same, and that get bigger the greater the difference between the luminance scale IDs becomes. All of the diagonal values where the luminance scale IDs are the same are zero, possessing a reflexive property of the diagonal positions. It is thus possible to rapidly execute the process when querying the penalty matrix to derive the luminance scale ID range, because the similarity distance of the two luminance scale IDs is computed simply by a table query.

In step S1308, the penalty matrix between the luminance scale IDs is queried using the two luminance scale IDs that are extracted in step S1307, whereby a localized similarity distance is obtained and added to the similarity distance.

In step S1309, the block to be processed is shifted to the next block in the sequence.

If, on the other hand, the image partitioned block that is yet to be compared is not present in step S1306, i.e., step S1306 is "NO", the sequence proceeds to step S1310, wherein the similarity distance is stored in association with the image ID, followed by another check in step S1302 for the presence or absence of an image to be compared. If no image to be compared remains in step S1302, i.e., step S1302 is "NO", the sequence proceeds to step S1311, wherein the image ID is sorted in ascending order by the similarity distance, and the sorted image ID and the similarity distance are temporarily stored in the luminance information index as the luminance feature similarity comparison findings.

The search results by the luminance feature denote an example, and it would be permissible to employ any search process, provided that the image search is performed in accordance with the luminance feature information.

Integration of Comparison Findings

Figure 15A:
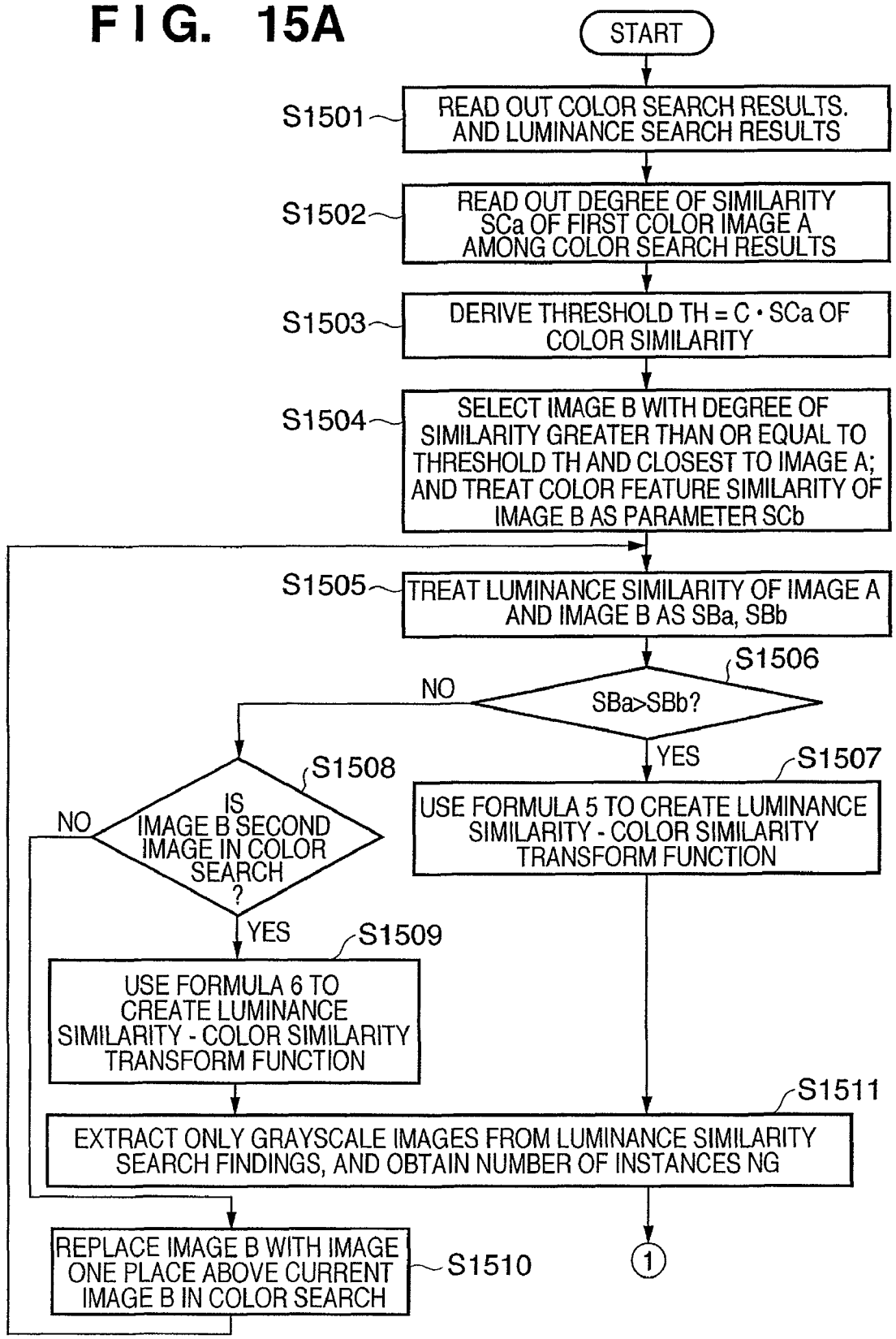
FIG. 15 is a flowchart depicting a flow of a process of generating a luminance similarity—color similarity transform function.
Figure 15B:
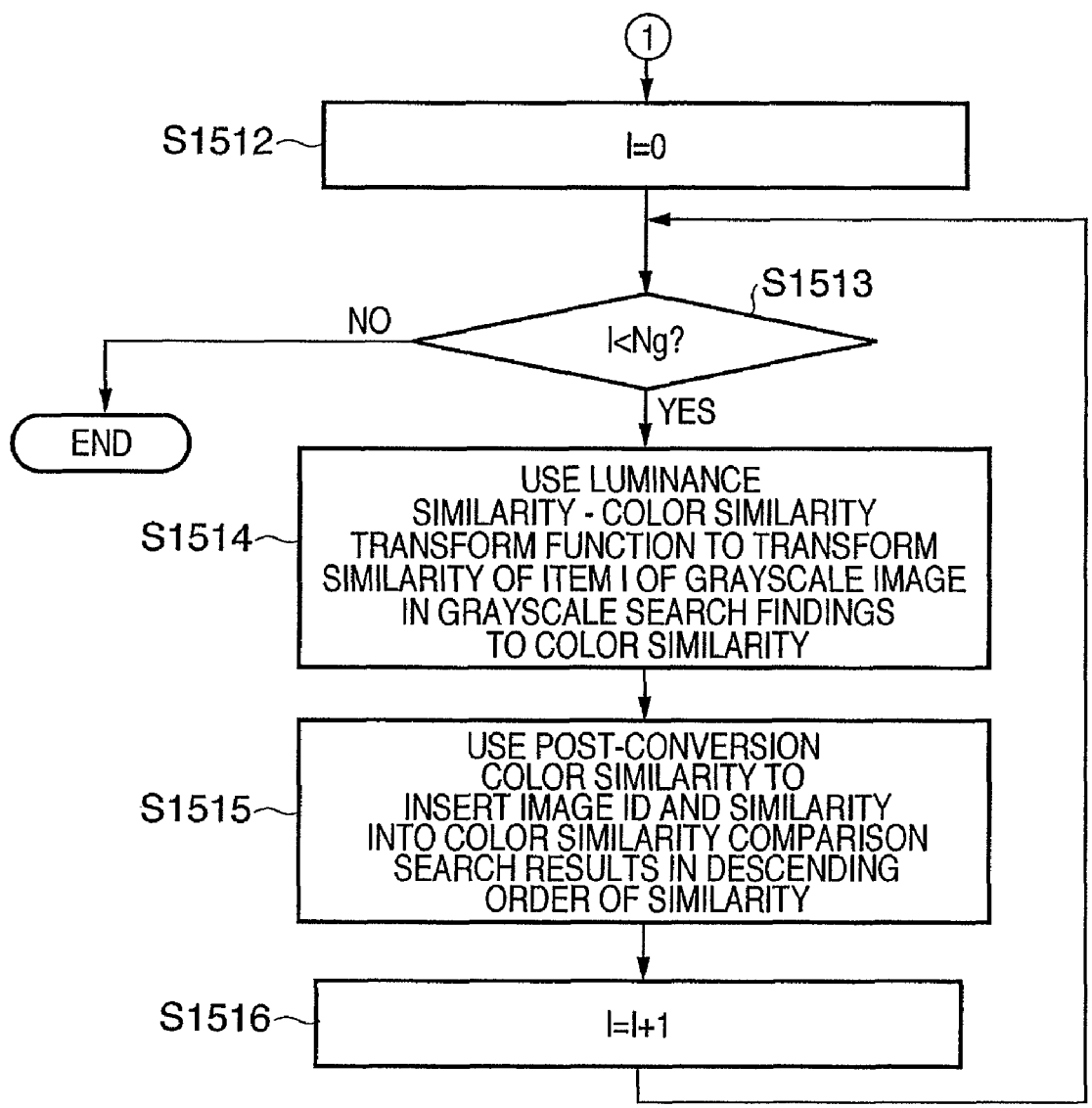

Following is a description relating to an integration of the color feature similarity comparison findings and the luminance feature similarity comparison findings. The following section describes a process that a luminance similarity—color similarity transform function generation processing unit (hereinafter "transform function generation processing unit") 111 executes, with reference to FIG. 15. FIG. 15 is a flowchart depicting a flow of a process of generating a luminance similarity—color similarity transform function that the transform function generation processing unit 111 executes.

In step S1501, the color search results, i.e., the color feature similarity comparison findings, and the luminance search results, i.e., the luminance feature similarity comparison findings, are read out. The information thus read out is temporarily storage controlled in a storage apparatus such as the RAM 992.

In step S1502, a degree of similarity SCa of a first color search image A is read out. The degree of similarity is a parameter, the similarity thereof with the comparison source image increasing the larger the value becomes. The parameter is derived in accordance with the similarity distance that is computed in the search process, via either the color feature or the luminance feature. In step S1502, the largest similarity value that is contained within the color search results is accordingly read out as the SCa. It is possible for the similarity to be derived, for example, by subtracting the similarity distance from a prescribed constant, or dividing the similarity distance into the prescribed constant.

In step S1503, a predetermined coefficient C, which is less than 1.0, is employed with Formula 2, following, to derive a threshold TH of the color similarity:

$$TH = C \cdot SCa \qquad (2)$$

As described hereinafter, the threshold TH is employed in a selection of a sample image, for example, an image B to be described hereinafter, that is used to derive a transform function that denotes a correspondence between the color similarity and the luminance similarity. It is desirable for the value of C to be not less than 0.8, because it is preferable for the sample image that is used to have a relatively high degree of similarity with the search source image.

In step S1504, an image B is selected, the degree of similarity thereof being greater than or equal to the threshold TH and has the greatest degree of similarity to the image A. A degree of similarity of comparison of the color feature similarity of the image B is treated as a parameter SCb, wherein a Formula 3, following, obtains:

$$SCa > SCb \quad (3)$$

In Step S1505, the degree of luminance similarity of the image A and the image B are read out from the luminance search results. The luminance similarity of the image A and of the image B are treated as a parameter SBa and a parameter SBb.

A determination is made in step S1506 as to whether or not Formula 4, following, is satisfied:

$$SBa > SBb \quad (4)$$

If Formula 4 is satisfied, i.e., step S1506 is "YES", the sequence proceeds to step S1507. If Formula 4 is not satisfied, i.e., step S1506 is "NO", the sequence proceeds to step S1508.

A luminance similarity—color similarity transform formula is created in step S1507. The transform function for transforming from the luminance similarity SB to the color similarity SC is derived as a linear formula that passes through two points: (SBa, SCa), (SBb, SCb). The formula that is created may take a form such as Formula 5, following:

$$SC = \alpha \cdot SB + \beta \quad (5)$$

where $\alpha = (SCb - SCa)/(SBb - SBa)$
and $\beta = (SCa \cdot SBb - SCb \cdot SBa)/(SBb - SBa)$ Note that SC undergoes saturation, i.e., normalization, processing between 0 and 100.

Figure 16:
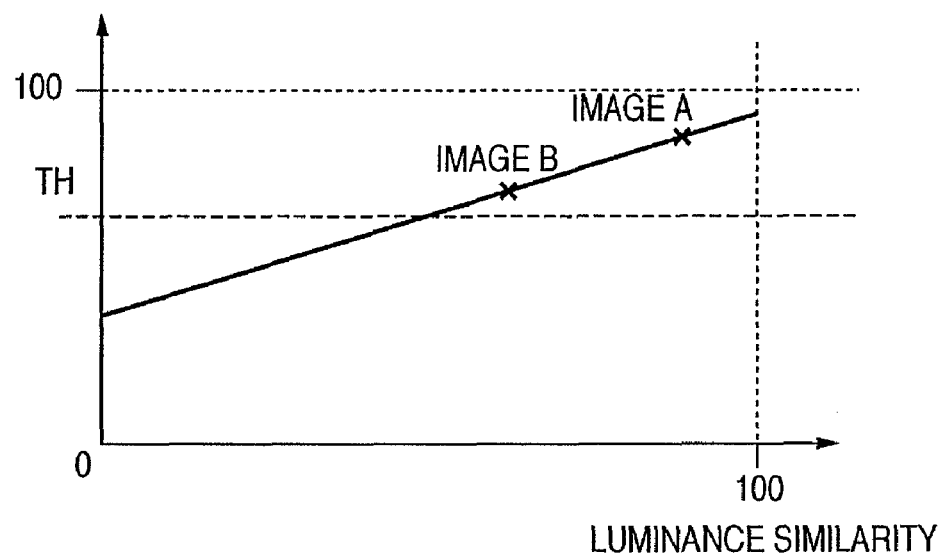
FIG. 16 is a schematic depiction of a formula for luminance similarity—color similarity transformation.

FIG. 16 is a schematic depiction of a formula for luminance similarity—color similarity transformation that is derived in step S1508. The line that is determined by the image A and the image B causes a desirable transformation of the luminance similarity into the color similarity. The similarity value may only range between 0 and 100, and any value that exceeds the range is subjected to the saturation, i.e., the normalization, process. When the process in step S1507 is completed, the sequence proceeds to step S1511.

If, on the other hand, it is determined that Formula 4 is not satisfied, i.e., step S1506 is "NO", a determination is made in step S1508 as to whether or not the image B reaches a second image in the color similarity comparison search. If the image B reaches the second image thereof, i.e., step S1508 is "YES", the sequence proceeds to step S1509. If the image B does not reach the second image thereof, i.e., step S1508 is "NO", the sequence proceeds to step S1510.

If the luminance similarity relation is SBa not greater than SBb, despite the image B reaching the second image in the color similarity comparison search and the color similarity relation being SCa>SCb, it would not be possible to hypothesize a correlation of a low color similarity with a low luminance similarity. Accordingly, it would not be possible to create the transform formula that is Formula 5. Consequently, in step S1509, it is presumed that:

$$SC = SB \quad (6)$$

Hence, the luminance similarity and the color similarity are treated as equivalent. The sequence proceeds to step S1511.

If the image B does not reach the second image in the color similarity comparison search in step S1508, i.e., step S1508 is "NO", an image that is one place above the current image B in a color similarity comparison search sequence is treated as a new image B in step S1510, and the sequence returns to step S1505.

A process of integrating the search results by way of a search results integration processing unit 112 that is depicted in FIG. 1 is executed in steps S1511 through S1516.

After the formula for luminance similarity—color similarity transformation is formulated in step S1507 and step S1509, only the portion of the luminance similarity comparison findings that relates to the grayscale image is extracted, and a number of instances Ng is obtained in step S1511. It is to be understood that it would also be possible to query the color flag, and perform the search on only the images among the luminance quality that are grayscale images instead.

In step S1512, a process counter I is reset to 0. The process counter I corresponds to the grayscale image to be processed.

A determination is performed in step S1513 as to whether or not I<Ng. If true, meaning, if not all of the grayscale image processing has been performed, i.e., step S1513 is "YES", the sequence proceeds to step S1514. If not true, meaning, if all of the grayscale image processing has been performed, i.e., step S1513 is "NO", the process terminates.

In step S1514, the luminance similarity—color similarity transform function is employed to transform the similarity of the item I of the grayscale image in the grayscale search results to the color similarity.

In step S1515, the post-conversion color similarity is used to insert the image ID and the similarity into the color similarity comparison search results in descending order of similarity, and integrates the grayscale image search results into the color image search results.

In step S1516, the process loop counter is incremented by 1, and the sequence returns to step S1513, repeating the process until I<Ng is no longer satisfied, i.e., until all of the grayscale search results are integrated into the color similarity comparison search results, whereupon the integration process terminates.

It is to be understood that it would also be permissible for the determination of the formula for luminance similarity—color similarity transformation to set the threshold TH of the color similarity to a fixed value, in place of the formula 2. Depending on the content of the recording image, the SCa itself may not exceed the TH, or the image B may not be determined. In such a circumstance, it would be possible to use formula 6, for example, in as an exception to the regular process.

It would also be permissible to employ an image of a predetermined color similarity comparison search order as the image B. It would be desirable to take the number of recorded images into account in such a circumstance. It may not be possible to obtain a satisfactory search result if only a small number of images are similar to the recorded image.

While the example treated two images, the image A and the image B, as the baseline images for deriving the transform function for performing an equivalent transformation of the luminance similarity into the color similarity, the process is not limited thereto. It is to be understood that it would be possible to use three or more images as the baseline images thereof. If three baseline images are employed, it would be necessary to satisfy the following formulae for the baseline images image A, image B, and image C:

$$SCa > SCb > Cc$$

$$SBa > SBb > SBc \quad (7)$$

It would be permissible to employ an approximate polynomial that passes through three points, (SBa, SCa), (SBb, SCb), (SBb, SCb), such as a nonlinear function, for example, a spline function or a Bezier function, for the equivalent transform function.

Figure 17:
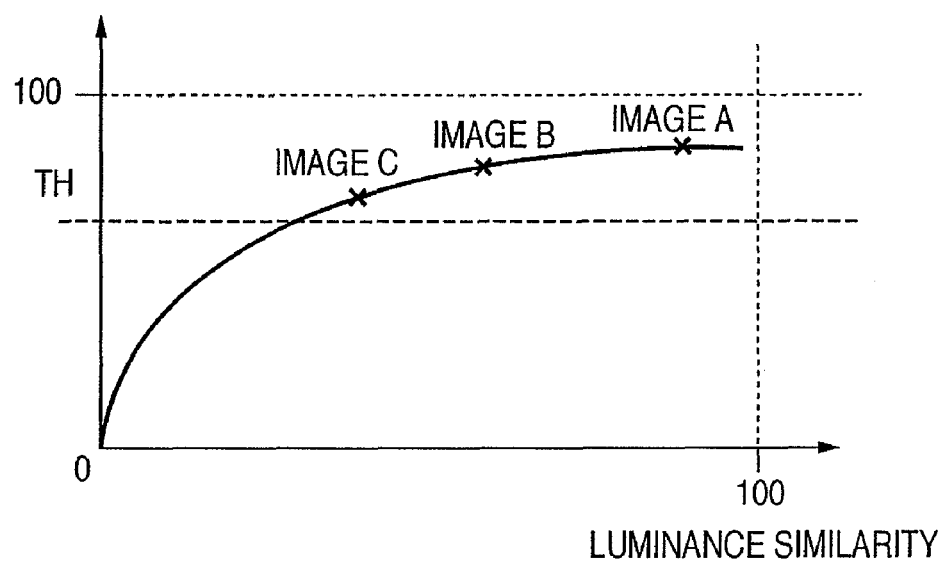
FIG. 17 is a schematic depiction of an exemplary luminance similarity—color similarity transform function, as pertains to a circumstance wherein three baseline images are used.

FIG. 17 is a schematic depiction of an exemplary luminance similarity—color similarity transform function, as pertains to the circumstance wherein three baseline images are used. FIG. 17 depicts a circumstance wherein the function passes through the origin, as well as the points of the three images. The luminance similarity is transformed as desired into the color similarity by way of a curve that is defined by the image A, the image B, the image C, and the origin.

Process of Displaying Search results

Figure 18:
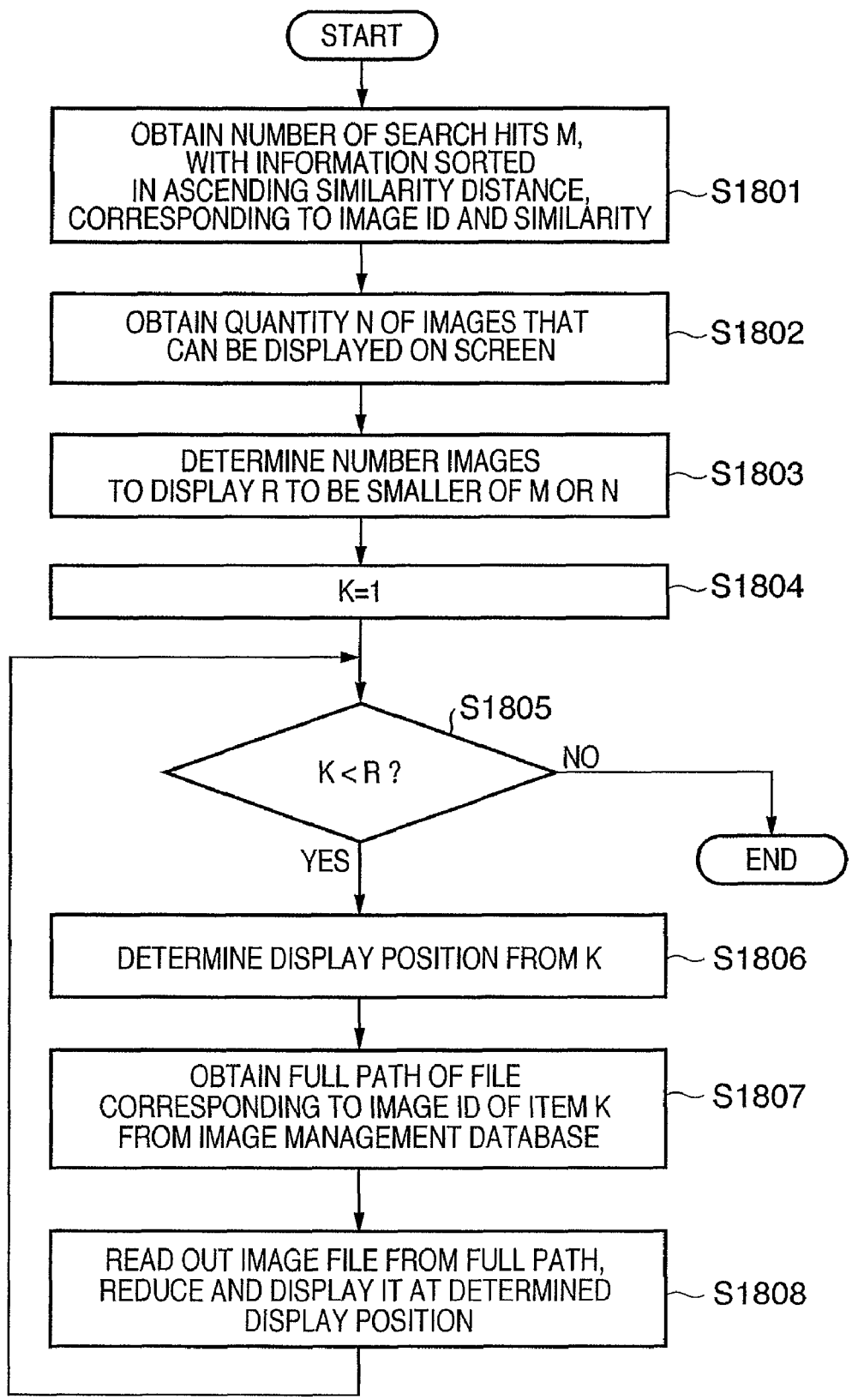
FIG. 18 is a flowchart depicting a flow of a process of displaying search results.

A search results display processing unit 113 in FIG. 1 queries the image management database depicted in FIG. 2, based on information that is sorted in order of increasing similarity, i.e., in ascending order of the similarity distance, corresponding to the image ID and the similarity thereof. The record that corresponds to the image ID is extracted, the full path information of the file obtained, the image read out from the image accumulation unit, and the image thus found displayed. The flow of the process thereof is depicted in FIG. 18. FIG. 18 is a flowchart depicting the flow of the process of displaying search results.

In step S1801, a number of search hits M is obtained, along with the information that is sorted in order of increasing similarity, i.e., in ascending order of the similarity distance, corresponding to the image ID and the similarity thereof.

In step S1802, a quantity N of images that can be displayed on a display screen is obtained. It would be possible to determine the quantity N of images that can be displayed in accordance with a comparison, such as a size and shape, etc., of a visible region of the display 997 with a size and shape, etc., of the image.

In step S1803, a number of images to be displayed R is set to the smaller of the number of hits M and the quantity of images that can be displayed N.

A process of displaying R images in sequence is performed in steps S1804 through S1808. In step S1804, a variable K that corresponds to the sequence of read-out images is initialized to 1.

A determination is made in step S1805 as to whether or not K≦R. If the inequality K≦R is satisfied, i.e., step S1805 is "YES", the process proceeds to step S1806, and the image display process in steps S1806 through S1808 is performed. If the inequality K≦R is not satisfied, i.e., step S1805 is "NO", the display process terminates.

Figure 19:
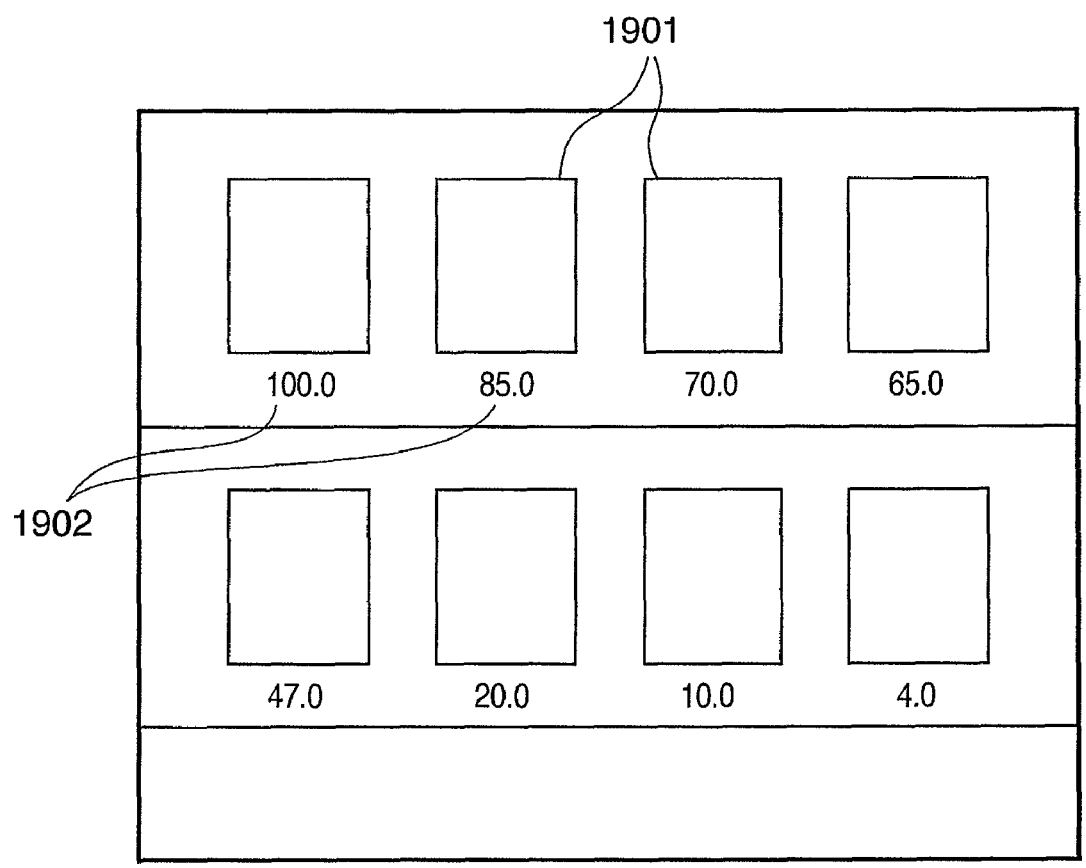
FIG. 19 is a schematic depiction of an example of a display of the findings of a similar image search.

In step S1806, a display position of an image that corresponds to the variable K is determined. FIG. 19 is a schematic depiction of an example of the display of the findings of the similar image search. Reference numeral 1901 in FIG. 19 is the display images, and reference numeral 1902 are values that depict the similarities of the images. In the example in FIG. 19, reduced images of the images found in the search are displayed in a search results display region from left to right in ascending order by the similarity range. When the rightmost edge of the search results display region is reached, the display moves to the leftmost edge of the next row of the search results display region, and the display is once again performed from left to right. It is possible, for example, to use such a rule in step S1806 to determine the display position of the image that corresponds to the variable K.

In step S1807, the full path information of the image file that corresponds to the image ID of the item K in the sequence is obtained from the image management database. In step S1808, the file is opened based on the full path information, the image is read out therefrom, and the reduced image is displayed at the display position that was determined in step S1806. As per reference numeral 1902, displaying the similarity range beneath the image is convenient from the standpoint of knowing how similar the images are.

In the configuration according to the embodiment, the image search results according to the color information are integrated with the image search results according to the luminance information, in accordance with the correspondence of the similarity according to the color information and the similarity according to the luminance information. It is thus possible to perform an integrated image search that is also highly precise, given the configuration according to the embodiment, even when color images and grayscale images are mixed together among the comparison images.

A function is generated that denotes the correspondence in accordance with the similarity according to the color information of the color image to be compared and the similarity according to the luminance information thereof, and the similarity according to the luminance information is transformed, via the function, into the similarity according to the color information of the color image. The search results are integrated in accordance with the similarity according to the transformed color information. It is thus possible to perform a high precision image search in accordance with the precision of the image search according to the color information.

According to the embodiment, the transform function is derived in accordance with the correspondence between the similarity according to the color information of the color image to be compared and the similarity according to the luminance information thereof, which is greater than or equal to the threshold that is predetermined from the similarity according to the color information. It is thus possible to transform the similarity according to the luminance information of the grayscale image to the similarity according to the color information as appropriate. In such a circumstance, it is possible to effect an appropriate transformation because the color image to be compared that is used is the color image to be compared that has the largest similarity according to the color information.

While the example describes the luminance similarity—color similarity transform function as being offered in the form of a mathematical formula according to the embodiment, the present invention is not limited thereto. It would be permissible for the luminance similarity—color similarity transform function to be offered in the form of a table, for example.

Second Embodiment

According to the present embodiment, the process of generating the luminance similarity—color similarity transform function that is executed according to the first embodiment via the luminance similarity-color similarity transform function generation processing unit 111 is not performed. Following is a description of an example that changes the content of the search results integration process via the search results integration processing unit 112 according to the present embodiment. Descriptions of other components are accordingly omitted, and only components that differ between the first embodiment and the present embodiment will be described herein. Given that such elements as the hardware configuration of the image searching apparatus, the image recording process, the image display process, and the search process according to the color information and the search process according to the luminance information that are contained within the image search process are similar to the comparable elements according to the first embodiment, descriptions thereof are accordingly omitted.

According to the first embodiment, the luminance similarity—color similarity transform function is generated, and the luminance similarity given an equivalence transformation to the color similarity, whereby the grayscale image luminance similarity comparison search results are inserted into the color similarity comparison search results. By contrast, according to the present embodiment, a correspondence between the color similarity comparison search results and the luminance similarity comparison search results is verified, and a determination made as to where to insert the grayscale image that hit only in the luminance similarity comparison search into the color similarity comparison search results into the color similarity comparison search results.

Integration of Comparison Findings

Figure 22:
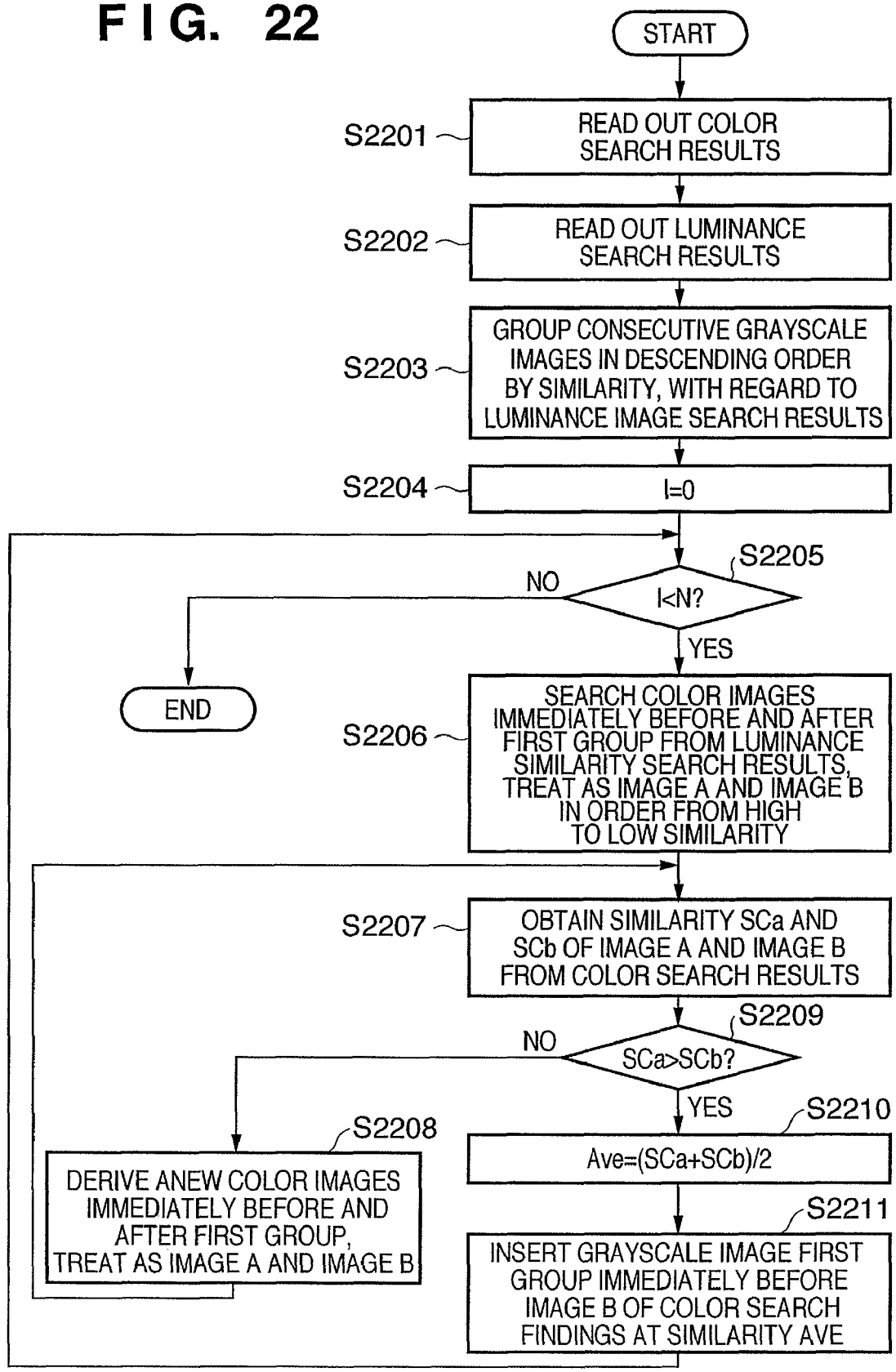
FIG. 22 is a flowchart depicting a flow of a process of integrating the color similarity comparison search results with the luminance similarity comparison search results.

Following is a description of a process of integrating the color similarity comparison search results with the luminance similarity comparison search results according to the embodiment, with reference to FIG. 22. FIG. 22 is a flowchart depicting a flow of the process of integrating the color similarity comparison search results with the luminance similarity comparison search results.

In step S2201, the color similarity comparison search results are read out and temporarily stored in a storage apparatus such as the RAM 992. In step S2202, the luminance similarity comparison search results are read out and similarly temporarily stored in a storage apparatus such as the RAM 992.

In step S2203, a consecutive sequence of grayscale images are respectively grouped in descending order by similarity, i.e., with lower group numbers aligned with higher similarities, with regard to the luminance similarity comparison search results, whereby the recorded images are sorted in accordance with the luminance similarity. Take, for example, a situation wherein color images C1, C2, and C3 and grayscale images G1, G2, and G3 are sorted according to luminance similarity as C1, G2, C3, G1, G3, and C2, wherein C1 has the highest luminance similarity. In such a circumstance, the consecutive grayscale images G1 and G3 are treated as a group, i.e., a first group, and G2 is treated as another group, i.e., a second group. The group that is generated in step S2203 is treated in its entirety hereinafter as N items. The data of the sequence of the grayscale images within each group is also stored in descending order by the luminance similarity.

FIG. 20 is a schematic depiction wherein the color similarity comparison search results are denoted in the upper tier, and the luminance similarity comparison search results are denoted in the lower tier. In FIG. 20, reference numerals Cr, C2, and C3 are color images, with the color feature and the luminance feature pertaining to the color image being extracted thus causing C1, C2, and C3 being presented in both the color feature search results and the luminance feature search results. Conversely, the grayscale images G1 and G2 have only the luminance similarity extracted thereof, thus resulting in the images appearing only in the luminance similarity comparison search results. In the example depicted in FIG. 20, a group is a single element, and the images G1 and G2 are in the first group.

A group counter I is initialized to zero in step S2204. A determination is made in step S2205 as to whether or not I<N. If true, i.e., step S2205 is "YES", the process proceeds to step S2206. If not true, i.e., steps S2206 is "NO", the process terminates. Hence, the process from step S2206 through step S2211 is performed while I does not exceed N, i.e., only while a group to be processed is present. The process of integrating the color/luminance similarity comparison search results terminates when no groups remain to be processed.

In step S2206, the color images immediately before and after the first group are searched from the luminance similarity comparison search results, and are treated as an image A and an image B in order from high to low similarity. In the example in FIG. 20, C1 is the image A, and C2 is the image B.

In step S2207, the color similarity SCa and SCb of the image A and the image B are obtained. The process proceeds to step S2209, wherein a determination is made as to whether or not SCa is greater than or equal to SCb. If true, i.e., step S2209 is "YES", the process proceeds to step S2210. If not true, i.e., step S2209 is "NO", the process proceeds to step S2208.

In the example in FIG. 20, the condition depicted in step S2209 is satisfied, and thus, the process proceeds to step S2210, wherein an average luminance similarity Ave of SCa and SCb is derived. In step S2211, the first group is inserted in the color search results immediately before the image B, at the similarity Ave, first G1, then G2, corresponding to treating the color similarity of the first group as the average similarity Ave of SCa and SCb.

The example in FIG. 21, for example, presumes a circumstance wherein C1 and C3, which are the images immediately before and after the images of interest G1 and G2, are inserted immediately before the image B in step S2211, and C2 is between C1 and C3 in the color search. FIG. 21 is a schematic depiction wherein the color similarity comparison search results are denoted in the upper tier, and the luminance similarity comparison search results are denoted in the lower tier. As the color feature search contains more information than the luminance feature search, it is desirable for the insertion position for G1 and G2 to be after C2, and to perform the integration process starting with the group with the highest similarity in the luminance similarity comparison search, because the further down the group, the lower down the sequence it should be inserted.

If the condition in step S2209 is not fulfilled, i.e., step S2209 is "NO", a different combination from the current image A and the current image B of the color image to either side is derived in step S2208. Thereafter, the process returns to step S2207, and the optimal color image to either side is derived.

When the integration of the first group search results in step S2211 is finished, the process returns to step S2205, wherein a determination is made as to whether or not any groups remain, and the process continues until no groups remain to be processed.

According to the embodiment, the grayscale image group is inserted into the color search results, in accordance with the similarity according to the color information of the color image that is contiguous with the group of grayscale images with regard to the luminance similarity comparison search results wherein the recorded images are sorted in accordance with the luminance similarity. It is thus possible to perform an image search that is both integrated and with a high degree of precision, even when the comparative target images comprise a mixture of color images and grayscale images alike.

Other Embodiments

Whereas an example using two baseline images and an example using four baseline images for the generation of the luminance similarity—color similarity transform function were depicted according to the first embodiment, the number of baseline images is not restricted thereto. It would be permissible to generate a nonlinear as well as a linear luminance similarity—color similarity transform function, even when using two baseline images. While an example was depicted that makes one of the baseline images into the first color similarity search image, it is not absolutely necessary for the first image to be one of the baseline images.

Whereas an example is depicted according to the second embodiment of a process that groups a consecutive sequence of grayscale images as pertains to the luminance similarity comparison search results in order to make the process more efficient, it would also be permissible, for example, to perform the process on an individual grayscale image basis.

While the exemplary embodiments of the present invention have been described in detail, it would be possible for the present invention to assume an embodiment such as a system, an apparatus, a method, a program, or a storage medium. It would be permissible to apply the present invention to a system that is configured of a plurality of devices, as well as to an apparatus that is configured of a single device.

The present invention incorporates a circumstance wherein a program that implements the functions of the embodiments is supplied, either directly or remotely, to the system or the apparatus, and a computer that is in the system or the apparatus loads and executes the program code thus supplied.

The program code that is installed on the computer in order to implement the function processing of the present invention is itself included within the technological scope of the present invention. The present invention thus includes the computer program for implementing the function processing of the present invention.

In such a circumstance, the program may take such a form as object code, a program that is executed by an interpreter, or a script that is supplied to an operating system, provided that the function of the program is present.

The recording medium that supplies the program may include such as the following, for example: a floppy disk, a hard drive, an optical disc, a magneto-optical disk (M/O), a CD-ROM, a CD-R, a CD-RW, a magnetic tape, a nonvolatile memory card, a ROM, a DVD, a DVD-ROM, or a DVD-R.

Another conceivable method of supplying the program may include the following. It would be conceivable to employ a web browser on a client apparatus to connect to a webpage on the Internet/World Wide Web, and download either the computer program according to the present invention or a compressed file that includes an automated installation function to a recording medium such as a hard drive. Implementation would also be possible by segmenting the program code that configures the program according to the present invention, and downloading each respective file from a different webpage. The World Wide Web server that downloads the program files for implementing the function processing of the present invention to a plurality of users is thus included within the present invention.

Another conceivable supply method is as follows. The program according to the present invention is encrypted, stored on a recording device such as a CD-ROM, and distributed to the user. The user who satisfies a prescribed condition downloads a key information from a webpage on the Internet/World Wide Web that decrypts the file encryption, and the configuration according to the present invention is implemented by using the key information to execute and install the encrypted program on the computer. Such a supply method would also be possible.

Such an embodiment as the following would be conceivable as well, in addition to implementing the functions according to the embodiments by having the computer execute the loaded program. It would be possible for the functions of the embodiments to be implemented by way of a process that the operating system or other software running on the computer executes, in whole or in part, in accordance with the instructions of the program.

The functions of the embodiments are also implemented in accordance with the instructions of the program that is loaded from the recording medium and written to a memory unit that is a component of an expansion board that is inserted into the computer, or of an expansion unit that is connected to the computer. The functions of the embodiments are thus implemented by way of the processing that is performed, in whole or in part, by a CPU or other device that is part of the expansion board or the expansion unit.

According to the present invention, it is possible to offer a technology that facilitates searching for a similar image with a high degree of precision even when the comparative target images comprise a mixture of color images and grayscale images alike.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-280596, filed Oct. 13, 2006, which is hereby incorporated by reference herein in its entirety.

What is claimed is:

1. An image searching apparatus which searches for an image that is similar to a query image from among a plurality of images to be compared with, comprising:
    an extraction unit adapted to extract a color feature parameter and a luminance feature parameter of the query image;
    a first derivation unit adapted to compare the color feature parameter of the query image with the color feature parameter of each of color images to be compared with, and to derive a color similarity that denotes a degree of similarity therebetween;
    a second derivation unit adapted to compare the luminance feature parameter of the query image with the luminance feature parameter of each of color images and grayscale images to be compared with, and to derive a luminance similarity that denotes a degree of similarity therebetween;
    a transform unit adapted to transform the luminance similarity of each of the grayscale images to be compared with and the query image into an integrated similarity that is integrated in accordance with a correspondence between the color similarity and the luminance similarity of each of the color images to be compared with; and
    an output unit adapted to output the images to be compared in order by similarity, using the color similarity of the color images to be compared that is derived by the first derivation unit, and the integrated similarity of the grayscale images to be compared that is transformed via the transform unit.

2. The image searching apparatus according to claim 1, further comprising:
    a generating unit adapted to generate a correspondence information that denotes a correspondence between the color similarity and the luminance similarity, in accordance with a comparison between the color similarity and the luminance similarity of each of the color images to be compared, wherein
    the transform unit transforms the luminance similarity for each of the respective grayscale images to be compared into an integrated color similarity in accordance with the correspondence information; and the output unit performs the output in accordance with a comparison between the color similarity of each of the color images to be compared and the integrated similarity that is transformed from the luminance similarity by the transform unit.

3. The image searching apparatus according to claim 2, wherein:

the generating unit selects two or more of the color images to be compared, the color similarity whereof is greater than or equal to a predetermined threshold, and generates the correspondence information in accordance with the color similarity and the luminance similarity of the selected color images to be compared.

4. The image searching apparatus according to claim 3, wherein:

the generating unit selects the color image to be compared that has the greatest color similarity.

5. The image searching apparatus according to claim 1, wherein:

the transform unit performs the transform of the order of the integrated similarity of the grayscale image to be compared wherein the order of the luminance similarity is between a first order of the luminance similarity of the color image to be compared and a second order of the luminance similarity of the color image to be compared, by determining between the first order of color similarity of the color image to be compared and the second order of the color similarity of the color image to be compared.

6. The image searching apparatus according to claim 5, wherein:

an ordering of the first order of the luminance similarity of the color image to be compared and the second order of the luminance similarity of the color image to be compared match an ordering of the first order of color similarity of the color image to be compared and the second order of the color similarity of the color image to be compared.

7. The image searching apparatus according to claim 1, further comprising:

a display control unit adapted to display a listing of the images to be compared on a display device, in accordance with the similarity order of the images to be compared that is outputted by the output unit.

8. A control method of an image searching apparatus which searches for an image that is similar to a query image from among a plurality of images to be compared with, comprising the steps of:

extracting a color feature parameter and a luminance feature parameter of the query image;

comparing the color feature parameter of the query image with the color feature parameter of each of color images to be compared with, and deriving a color similarity that denotes a degree of similarity therebetween;

comparing the luminance feature parameter of the query image with the luminance feature parameter of each of color images and grayscale images to be compared with, and deriving a luminance similarity that denotes a degree of similarity therebetween;

transforming the luminance similarity of the grayscale images to be compared with and the query image into an integrated similarity that is integrated in accordance with a correspondence between the color similarity and the luminance similarity of the color images to be compared with; and outputting the images to be compared in order by similarity, using the color similarity of each of the color images to be compared that is derived by the first derivation step, and the integrated similarity of each of the grayscale images to be compared that is transformed via the transform step.

9. A program stored in a computer-readable storage medium that makes a computer function as the image searching apparatus according to claim 1.

10. A computer-readable storage medium storing the program according to claim 9.

* * * * *